United States Patent [19]

Tokumitsu

[11] Patent Number: 4,510,535
[45] Date of Patent: Apr. 9, 1985

[54] VIDEO INSERT EDITING WITH CONTROL SIGNALS DERIVED OFF TAPE OR FROM THE INSERT

[75] Inventor: Junsuke Tokumitsu, Yokohama, Japan

[73] Assignee: Victor Company of Japan, Ltd., Kanagawa, Japan

[21] Appl. No.: 449,828

[22] Filed: Dec. 14, 1982

[30] Foreign Application Priority Data

Dec. 22, 1981 [JP] Japan .................. 56-191414[U]

[51] Int. Cl.³ .................. H04N 5/782; G11B 27/02
[52] U.S. Cl. .................. 360/14.2; 360/13; 360/70; 360/73
[58] Field of Search .................. 360/13, 14.1, 14.2, 360/70, 73

[56] References Cited

U.S. PATENT DOCUMENTS 4,115,819  9/1978  Shigeta ..................... 360/14.1
4,175,271 11/1979  Kaemmerer ................ 360/14.1

FOREIGN PATENT DOCUMENTS 2263591 12/1972  Fed. Rep. of Germany .
2423489  5/1974  Fed. Rep. of Germany .
1441169  6/1976  United Kingdom .

OTHER PUBLICATIONS

Kybett, Harry; Video Tape Recorders; 1974; Sams Publishing; Ch. 10.

Primary Examiner—Raymond F. Cardillo, Jr.
Assistant Examiner—Alan K. Aldous
Attorney, Agent, or Firm—Ladas & Parry

[57] ABSTRACT

A magnetic recording and reproducing apparatus comprises first through fourth circuits. The first circuit edits and records a new video signal within a predetermined section of a magnetic tape which is pre-recorded with a video signal and a control signal on respective video and control tracks. The second circuit produces a new control signal having a frequency identical to that of the pre-recorded control signal. The third circuit reproduces the pre-recorded control signal from the tape while the first circuit is operating. The fourth circuit detects the existence of a control signal reproduced by the third circuit, and supplies the new control signal which is produced by the second circuit to the third circuit when the non-existence of the reproduced control signal is detected, so as to record the new control signal on the control track of the tape.

5 Claims, 6 Drawing Figures

VIDEO INSERT EDITING WITH CONTROL SIGNALS DERIVED OFF TAPE OR FROM THE INSERT

BACKGROUND OF THE INVENTION

The present invention generally relates to magnetic recording and reproducing apparatuses capable of carrying out editing, and more particularly to a magnetic recording and reproducing apparatus capable of positively carrying out so-called "insert editing" in which the recording is carried out by changing a video signal within a predetermined section of a magnetic tape which is recorded with a program video signal into a different program video signal, even when a control signal does not exist on a control track of the magnetic tape.

Conventionally, an editing system is employed to carry out so-called insert editing with respect to a magnetic tape which is recorded with a program video signal. When the insert editing is carried out, a video signal which is recorded within a predetermined section of the magnetic tape, is replaced by a video signal of a different program. During the insert editing, one system records a different program video signal by rotary recording and reproducing heads, while erasing the recorded signal by rotary erasing heads. In another system, a frequency-modulated video signal of a different program is recorded over the recorded signal by overlap recording, in order to record another program video signal. According to this other system, the recorded signal is essentially erased due to the demagnetizing effect. In these systems, a servo system for controlling the tape travel upon insert editing, is controlled by a control signal or a control pulse reproduced from a control track on the magnetic tape.

However, if an unrecorded section in which the video signal is not recorded exists within a predetermined section where the insert editing is to be carried out, the control signal is also not recorded in this unrecorded section. In addition, if the operator forgets to set a termination point of the insert editorial recording and the insert editing is continuously carried out exceeding a recorded range, the control signal is not recorded beyond that recorded range. Accordingly, in these cases, although the apparatus is in an insert editing mode, the servo operation of the capstan servo system becomes irregular because there is no reproduced control signal. Thus, there was a disadvantage in that a fine insert editing could not be carried out.

SUMMARY OF THE INVENTION

Accordingly, it is a general object of the present invention to provide a novel and useful magnetic recording and reproducing apparatus capable of carrying out editing, in which the above described disadvantages have been overcome.

Another and more specific object of the present invention is to provide a magnetic recording and reproducing apparatus which continues to carry out an insert editing by controlling a servo system by use of a control signal obtained from a video signal which is to be recorded by the insert editing, when it is detected that there is no reproduced control signal during an insert editing mode.

Other objects and further features of the present invention will be apparent from the following detailed description when read in conjunction with the accompanying drawings.

DETAILED DESCRIPTION

Figure 1:
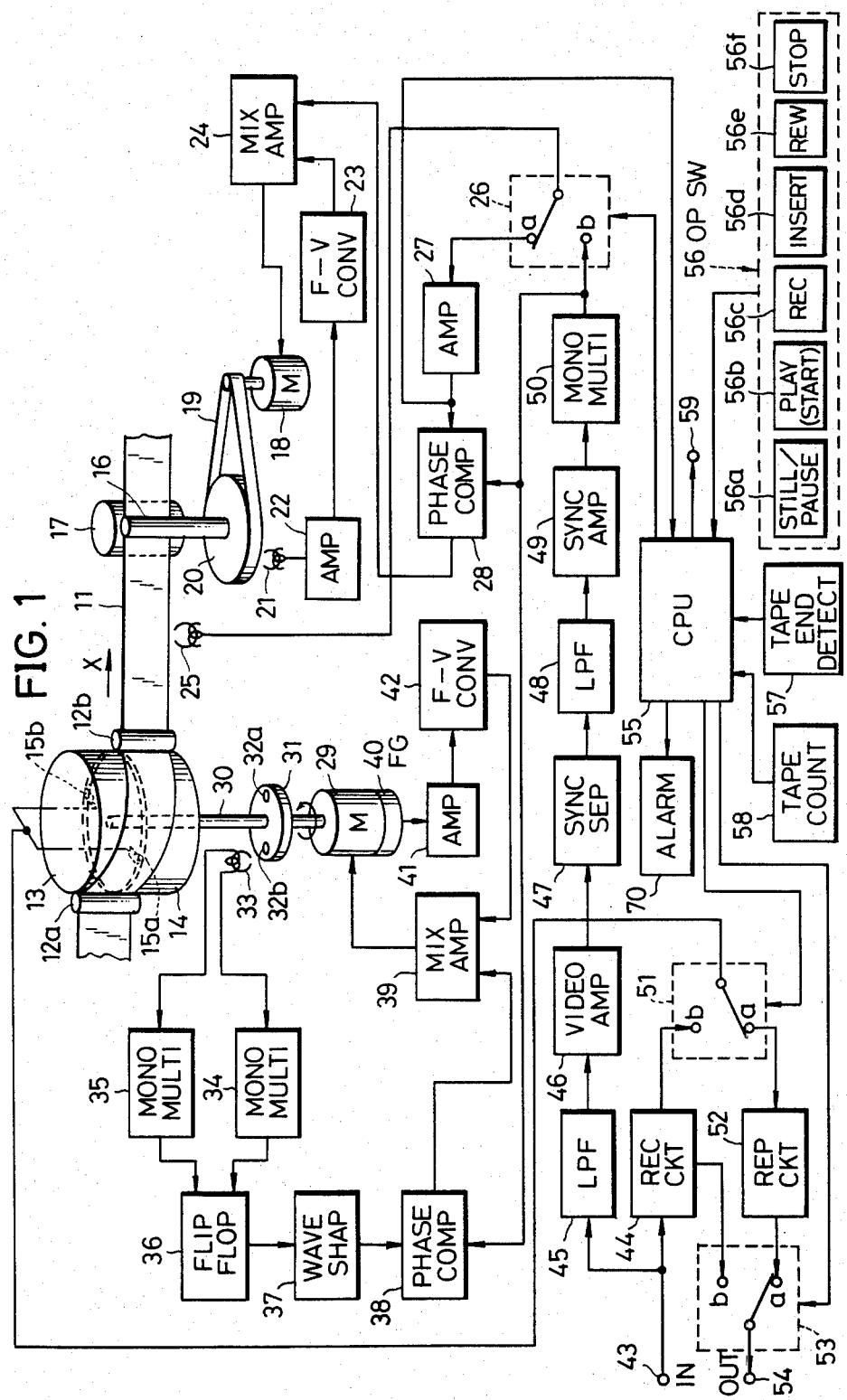
FIG. 1 is a system block diagram showing an embodiment of a magnetic recording and reproducing apparatus according to the present invention.
Figure 3:
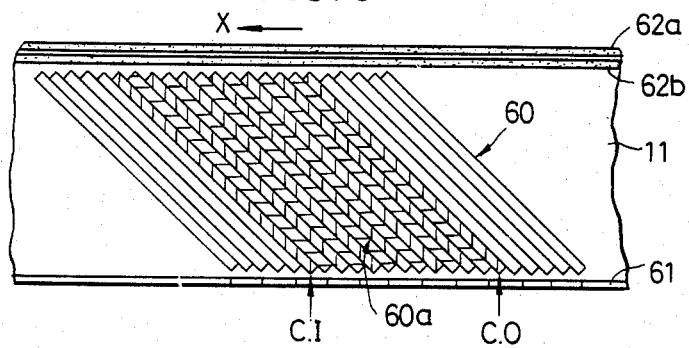
FIG. 3 is a diagram showing a track pattern on a tape.

In FIG. 1, a magnetic tape 11 is guided by guide poles 12a and 12b, and wrapped obliquely around peripheral surfaces of a rotary drum 13 and a stationary drum 14, throughout an angular range slightly over 180°. This tape 11 is pinched between a capstan 16 and a pinch roller 17, and caused to travel in the direction of an arrow X due to the rotation of the capstan 16. As shown in FIG. 3, a frequency-modulated video signal, for example, is recorded on tracks 60 formed obliquely with respect to the longitudinal direction of the tape 11. In addition, a control signal or a control pulse having a constant period is recorded on a control track 61 formed on one side edge along the longitudinal direction of the tape 11. Further, audio signals are recorded on audio tracks 62a and 62b formed on the other side edge along the longitudinal direction of the tape 11. One field of video signal is recorded on the oblique tracks 60 on the tape 11. Rotary video heads 15a and 15b are mounted at diametrical positions on the rotary drum 13. These video heads 15a and 15b alternately scan over the oblique tracks 60 on the tape 11.

A motor 18 rotates a flywheel 20 by way of a belt 19. Thus, the capstan 16 which is coaxially provided at a center part of the flywheel 20, is accordingly rotated. As the flywheel 20 rotates, a pickup head 21 produces a pulse every time a magnet (not shown) provided on the flywheel 20 passes a position opposing a gap surface of the pickup head 21. This pulse from the pickup head 21 is supplied to a frequency-to-voltage (F-V) converter 23 through an amplifier 22, as a rotation detection signal of the capstan 16. An output of the F-V converter 23 is supplied to a mixing amplifier 24.

A control signal is reproduced from the control track 61 on the tape 11 which is caused to travel in the direction of the arrow X, by a control head 25. The reproduced control signal is supplied to an amplifier 27 through a switching circuit 26 which is connected to a contact a, and further supplied to a phase comparator 28.

On the other hand, an output video signal of an image pickup camera, for example, is applied to a terminal 43, and supplied to a recording signal processing circuit 44 and a lowpass filter 45. A carrier chrominance signal component of the video signal is eliminated at the lowpass filter 45, and a luminance signal component thus obtained is supplied to a synchronizing signal separating circuit 47 through a video amplifier 46. A composite synchronizing signal is separated at the separating circuit 47. The separated composite synchronizing signal is supplied to a lowpass filter 48 wherein a vertical synchronizing signal is obtained. This vertical synchronizing signal is applied to a monostable multivibrator 50 through a synchronous amplifier 49. The frequency of the vertical synchronizing signal is thus frequency-divided into ½ its original frequency at the monostable multivibrator 50, and a pulse having a frequency of 30 Hz is accordingly obtained. This output pulse of the monostable multivibrator 50 is applied to a contact b of the switching circuit 26, and also supplied to phase comparators 28 and 38.

An output of the phase comparator 28 is supplied to the mixing amplifier 24. An output of the mixing amplifier 24 is applied to the motor 18 to control the rotation of the motor 18. Accordingly, the tape 11 travels in synchronism with the video signal from the camera. During a normal reproduction, an output signal of a reference frequency signal oscillator which is separately provided, may be applied to the phase comparator 28 instead of applying the output of the monostable multivibrator 50 to the phase comparator 28.

A rotary shaft 30 of a drum motor 29 passes through a center part of the stationary drum 14, and is coaxially fixed at a center part of the rotary drum 13. A disc 31 is fixed at a part of the rotary saft 30, so that the rotary shaft 30 passes through a center part of the disc 31. When the drum motor 29 rotates, the rotary drum 13 and the disc 31 rotate unitarily. Magnets 32a and 32b are respectively provided on the disc 31, at diametrical positions on the disc 31. The rotational phase of the drum motor 29 is detected by a drum pickup head 33 and the magnets 32a and 32b. Phase detection signals of mutually opposite polarities are alternately and respectively obtained from the drum pickup head 33, and supplied to monostable multivibrators 34 and 35.

Pulses obtained from the monostable multivibrators 34 and 35 are applied to a flip-flop 36, to alternately reverse the stable states of the flip-flop 36. Hence, a square wave having a frequency of 30 Hz, for example, is obtained from the flip-flop 36. This square wave assumes high level during a track scanning period of one of the video heads 15a and 15b, and assumes low level during a track scanning period of the other video head. The above square wave is subjected to wave-shaping at a wave shaping circuit 37. An output of the wave shaping circuit 37 is applied to the phase comparator 38 as a comparison signal.

Further, a frequency signal in accordance with the rotational speed of the drum motor 29 is obtained from a frequency generator (FG) 40, and supplied to a frequency-to-voltage (F-V) converter 42 through an amplifier 41. An output of the F-V converter 42 is supplied to a mixing amplifier 39. The rotation of the drum motor 29 is controlled by an output of the mixing amplifier 39.

The video signal reproduced from the video heads 15a and 15b, is supplied to a reproduced signal processing circuit 52 through a switching circuit 51 which is connected to a contact a during the reproducing mode, and a known signal processing is carried out in the processing circuit 52. The reproduced video signal is obtained at an output terminal 54 through a switching circuit 53 which is connected to a terminal a. The reproduced video signal obtained from the output terminal 54 is supplied to a receiver (not shown) for monitoring, and reproduced as a picture.

During a recording mode, the switching circuit 51 is connected to a terminal b, and a recording video signal which is subjected to a known signal processing at the recording signal processing circuit 44 is obtained at the terminal 43. The recording video signal obtained from the terminal 43 is supplied to the video heads 15a and 15b through the switching circuit 51, and recorded on the video tracks 60 on the tape 11.

Next, description will be given with respect to the operating sequence and the operation of the apparatus, when carrying out an insert editing.

First, before carrying out the insert editing, a play button 56b of an operating switch part 56 is pushed. A signal from the operating switch part 56 is supplied to a central processing unit (hereinafter simply referred to as a CPU) 55, and a reproducing mode signal from the CPU 55 is obtained through a terminal 59 to put the whole apparatus into a reproducing mode. The operator monitors the picture reproduced on the receiver, and pushes a still/pause button 56a to stop the tape travel, when the tape 11 reaches a position (cut-out point indicated by C.O. in FIG. 3) where the insert editing is to be terminated. At this point in time, a tape counter 58 is reset, so that the display reads "0000".

Next, the tape 11 is wound back by a predetermined quantity, by pushing a rewind button 56e to put the apparatus into a rewind mode. After pushing a stop button 56f, the play button 56b is pushed to put the apparatus into the reproducing mode. The operator detects a position (cut-in point indicated by C.I. in FIG. 3) where the insert editing is to be started, while monitoring the picture reproduced on the receiver. When the tape 11 reaches the starting position of the insert editing, the still/pause button 56a is pushed, to put the apparatus into a still mode. Thereafter, when an insert editing button 56d is pushed, the tape 11 stops after being slightly rewound, due to a signal from the CPU 55 obtained through the terminal 59. As the operating sequence of the buttons, the still/pause button 56a and the insert editing button 56d may be pushed simultaneously. The above rewinding quantity is set to a degree so that when an insert editing mode is next started and the video heads start recording from the position C.I., the tape 11 already assumes a predetermined traveling speed. At this point in time, the tape counter 58 shows a value which is subtracted from the value "0000" reset at the position C.O., according to the rewinding of the tape 11.

In a state where the insert editing button 56d is pushed as described above, the travel of the tape 11 in the direction of the arrow X by the capstan 16 is started when the play (start) button 56b is pushed. As the traveling speed of the tape 11 reaches the predetermined traveling speed and the position C.I. of the tape reaches the guide drum, the switching circuit 51 is switched over and connected to a contact b by a switching signal from the CPU 55. Actually, the CPU 55 produces and supplies the switching signal after delaying by a delay time until the traveling speed of the tape 11 reaches the predetermined traveling speed from the time when the play (start) button 56b is pushed.

Accordingly, the video signal from the input terminal 43 is recorded onto the video tracks 60 on the tape 11 from the position C.I., by the video heads 15a and 15b. When recording a new frequency-modulated video signal over the video tracks 60 already recorded with a frequency-modulated video signal, by the video heads 15a and 15b, the recorded signal is essentially erased by the recording of the new signal.

If the play (start) button 56b is pushed in a state where the insert editing button 56d is pushed, a switching signal is applied to the switching circuit 53 from the CPU 55, to switch over and connect the switching circuit 53 to a contact b. Hence, the recording video signal from the terminal 43 is obtained from the terminal 54 as the insert editing mode is started, and a picture obtained from the recorded signal is reproduced on the receiver for monitoring.

The new video signal obtained from the input terminal 43, is recorded by insert editing from the position C.I. to the position C.O. on the tape 11. Thus, a track part 60a is formed in a range from the position C.I. to the position C.O. within the tracks 60 on the tape 11, wherein the insert editing is carried out.

During the above insert editorial recording, the value shown in the tape counter 58 starts increasing from the subtracted value upon starting of the insert editing. When the position C.O. is reached, the tape counter 58 shows a value "0000" and supplies a signal to the CPU 55. As a result, a signal from the CPU 55 is obtained through the terminal 59. Therefore, the whole apparatus is cancelled from the insert editing mode and assumes a reproducing mode, to reproduce the video tracks 60 beyond the position C.O. At this point in time, the switching circuits 51 and 53 are respectively switched over and connected to their contacts a according to the signals from the CPU 55. The reproduced signal from the video heads 15a and 15b is thus obtained from the output terminal 54, and supplied to the receiver for monitoring the reproduced picture. Similarly as upon reproduction after the insert editing, the control signal recorded on the control track 61 is also reproduced by the control head 25 during the insert editing. Further, as described before, the capstan motor 18 is rotationally controlled according to the reproduced control signal.

During the insert editing, the recorded audio signals on the audio tracks 62a and 62b are erased by an audio erasing head (not shown), and an audio signal corresponding to the video signal recorded by the insert editing is recorded on the audio tracks 62a and 62b by an audio head (not shown).

In addition, in a case where the terminating position of the insert editing is not searched beforehand and the insert editing is started after searching only the starting position of the insert editing, the tape 11 may travel up to the terminal end of the tape before the insert editing is terminated. In such a case, a tape terminal end detector 57 operates, to put the apparatus into a stop mode by a signal from the CPU 55 obtained through the terminal 59. This tape terminal end detector 57 optically detects a transparent leader tape which is adhered to the terminal end of the tape on one end and fixed to a reel hub on the other end. Moreover, if the insert editing mode is to be discontinued because the terminal end of the tape will be reached if the insert editing mode is continued, or if the insert editing mode is to be discontinued for other reasons, the stop button 56f is pushed. Further, the tape counter 58 may be reset to zero instead of pushing the stop button 56f.

A recording button 56c and the play (start) button 56b are pushed simultaneously, when carrying out a normal recording.

The operation described heretofore is the operation for carrying out the normal insert editing which was conventionally carried out.

However, there are cases where the control signal is not recorded at a part corresponding to the track part 60a between the positions C.I. and C.O. within the control track 61. That is, the control signal may not be recorded on the control track 61 where the control head 25 makes contact with the tape, while the video heads 15a and 15b scan over the track part 60a. As described before, such a case will occur if the video signal is originally not recorded between the positions C.I. and C.O., and the control signal is accordingly not recorded in such a case. Furthermore, if the operator forgets to search for the position C.O. and reset the tape counter 58 to "0000", and simply starts the insert editing operation, the insert editing operation will not terminate automatically. If the insert editing is continuously carried out exceeding the recorded signal part in this state, the control signal is not recorded beyond the recorded signal part.

A reproduced control signal does not exist under the above circumstances. Accordingly, there is no signal supplied to the phase comparator 28 from the amplifier 27, and the servo system with respect to the capstan motor 18 does not operate in a normal manner. Hence, in this case, the tape travel becomes unstable, and it no longer becomes possible to carry out the insert editing.

The apparatus according to the present invention has eliminated the above deficiency, and description will hereinafter be given with respect to the operation of the apparatus when there is no reproduced control signal.

As described before, when the control signal already recoded on the tape 11 is reproduced by the control head 25 in a normal manner during the insert editing mode, the switching circuit 26 continues to be connected to the contact a as upon normal reproduction. The reproduced control signal is supplied to the phase comparator 28, and the capstan servo system is controlled by the output of the phase comparator 28.

Figure 2:
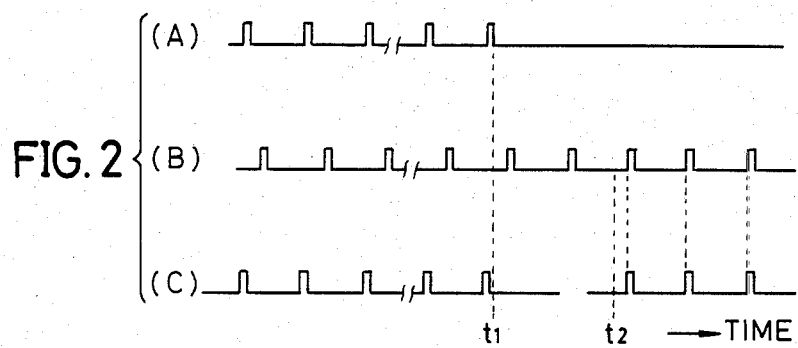
FIGS. 2(A) through 2(C) are graphs respectively showing signal waveforms of a control signal in the apparatus shown in FIG. 1 under different modes.

In addition, the output reproduced control signal of the amplifier 27 shown on the left side in FIG. 2(A), is supplied to the phase comparator 28 and the CPU 55. As described before, when a position is reached where the control signal is not recorded on the control track 61 at a time t1, the reproduced control signal supplied to the CPU 55 from the amplifier 27 ceases after the time t1 as shown in FIG. 2(A). On the other hand, a pulse signal shown in FIG. 2(B) having a period (1/30 second) identical to that of the control signal, is produced from the monostable multivibrator 50.

The CPU 55 includes an internal timer. In the present embodiment of the invention, the operating time of this timer is set to a time corresponding to two to three periods of the reproduced control signal, that is, 1/15 second to 1/10 second, or in the order of 70 to 80 milliseconds, for example. Accordingly, when the reproduced control signal ceases at the time t1 as shown in FIG. 2(A), the timer of the CPU 55 operates so that the CPU 55 supplies a switching signal to the switching circuit 26 at a time t2 if a reproduced control signal does not exist even after a time corresponding to two pulses of the reproduced control signal has elapsed. Hence, the switching circuit 26 is switched over and connected to the contact b from the contact a. As a result, after the time t2, the output pulse signal of the monostable multivibrator 50 is applied to the control head 25 through the switching circuit 26 and recorded on the unrecorded control track 61 as a control signal. Therefore, the control signal on the control track 61 becomes as shown in FIG. 2(C).

After the switching of the switching circuit 26 to the contact b, the display of the tape counter 58 becomes "0000" while the above recording of the control signal is carried out. The insert editing of the video signal is continued until the tape end is detected by the tape end detector 57 or the stop button 56f is pushed. During the insert editing mode, after the recording of the control signal is started by the switching of the switching circuit 26, the recording of the control signal is continued even when a position is again reached where the control signal is already recorded. During such recording of the control signal, the control signal which is already recorded is demagnetized to an extent so as not to interfere upon reproduction carried out later on.

When reproducing a tape recorded with the control signal as described above and having the recorded control signal shown in FIG. 2(C), the control signal does not exist for a short interval after the time t1. Moreover, the first control pulse after the time t1 does not accurately exist two periods after the time t1. Hence, the reproduced picture becomes slightly unstable during this short interval, however, the capstan servo system immediately locks in on the control signal after the time t2 to obtain a stable tape travel.

During the insert editing, when it is detected that there is no reproduced control pulse, an alarm 70 may be operated to given a warning by illumination or generation of sound, in addition to switching the switching circuit 26 by the signal from the CPU 55 as described before.

Figure 4:
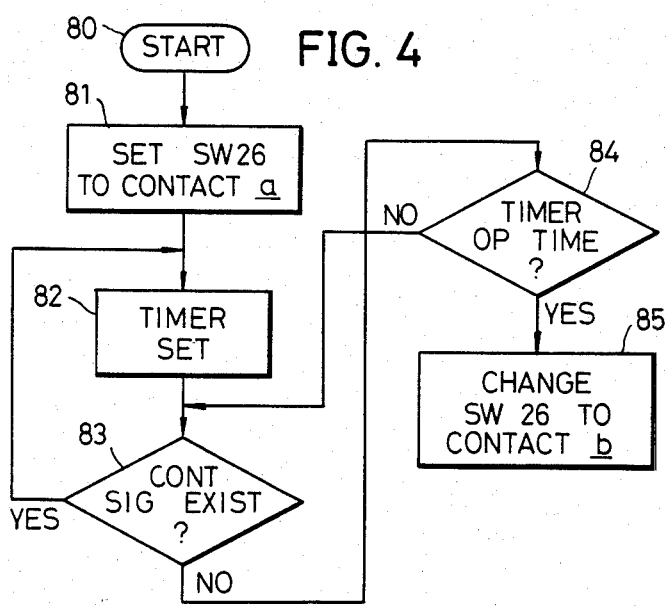
FIG. 4 is a flowchart for explaining an essential part of the operation of a central processing unit within the apparatus shown in FIG. 1.

An essential part of the operation of the CPU 55 is illustrated in a flowchart shown in FIG. 4. If the play (start) button 56b is pushed in a state where the insert editing button 56c is pushed, the insert editing is started at a step 80. The connection of the switching circuit 26 is set to become connected to the contact a at a step 81. The operating time of the timer is set to a time corresponding to two to three control pulse intervals, that is, in the order of 70 to 80 milliseconds, at a step 82. Discrimination is carried out in a step 83 to determine whether a reproduced control pulse exists. If the result of the discrimination at the step 83 is YES, that is, if a reproduced control pulse exists, the operation is returned to the step 82. On the other hand, if the result of the discrimination at the step 83 is NO, that is, if a reproduced control signal does not exist, discrimination is carried out at a step 84 to determine whether the timer has reached the above operating time (70 to 80 milliseconds). Until the timer reached the above operating time, the result of the discrimination at the step 84 is NO, and the operation is returned to the step 83. When the timer reaches the above operating time, the result of the discrimination at the step 84 becomes YES, and the connection of the switching circuit 26 is set to become connected to the contact b at a succeeding step 85. Accordingly, the insert editing of the video signal is carried out while the recording of the control signal is carried out with respect to the unrecorded part of the tape 11 where the control signal is not recorded.

If the operating time of the CPU 55 is set to a short time period in the order of one period of the control signal, it will be recognized that the part of the tape is an unrecorded part where the control signal is not recorded, even when one control signal is not reproduced accidentally due to signal dropout and the like. On the other hand, if the operating time of the timer is too long, the detection of the unrecorded part where the control signal is not recorded is accordingly delayed, and an unrecorded part between the recorded control signal and the newly recorded control signal becomes long. By considering these cases, it is desirable to select the operating time of the timer to a period in the order of two to three periods of the control signal, or in the order of 70 to 80 milliseconds in time.

In the above embodiment of the invention, the recorded video signal is erased by recording the new video signal over the recorded video signal during the insert editing. However, the new video signal may be recorded successively while successively erasing the recorded video signal by a rotary erasing head (so-called flying erase head).

Further, the present invention is not limited to these embodiments, but various variations and modifications may be made without departing from the scope of the present invention.

What is claimed is:

1. A magnetic recording and reproducing apparatus comprising:
   editing means for editing and recording a new video signal within a predetermined section of a magnetic tape which has already recorded thereon a video signal on video tracks and a control signal on a control track, respectively;
   control signal producing means for producing a new control signal having a frequency identical to that of the recorded control signal;
   control signal recording and reproducing means for reproducing the recorded control signal from said magnetic tape while said editing means is operating; and
   control signal recording control means for detecting existence of a control signal reproduced by said control signal recording and reproducing means, and for supplying the new control signal produced by said control signal producing means to said control signal recording and reproducing means when non-existence of the reproduced control signal is detected, to record said new control signal on the control track of said magnetic tape.

2. A magnetic recording and reproducing apparatus as claimed in claim 1 in which said control signal recording control means comprises detecting means for detecting non-existence of a reproduced control signal during a predetermined time period and producing a switching signal, and a switching circuit normally in a state for supplying the control signal reproduced by said control signal recording and reproducing means to said detecting means, said switching circuit being switched over to a state for supplying the control signal produced from said control signal producing means to said control signal recording and reproducing means by the output switching signal of said detecting means.

3. A magnetic recording and reproducing apparatus as claimed in claim 2 in which said predetermined time period of said detecting means is selected to a time longer than two periods of said control signal and shorter than three periods of said control signal.

4. A magnetic recording and reproducing apparatus as claimed in claim 2 in which said detecting means is provided within a central processing unit including an internal timer having an operating time equal to said predetermined time period.

5. A magnetic recording and reproducing apparatus as claimed in claim 2 which further comprises alarm means for generating an alarm in response to an output signal obtained when said detecting means detects that a reproduced control signal does not exist for said predetermined time period.

* * * * *